United States Patent [19]
Pojurowsky

[11] 3,877,951
[45] Apr. 15, 1975

[54] INSECTICIDE VARNISH
[75] Inventor: Leon Pojurowsky, Colayrac-Saint-Cirq, Lot-et-Garonne, France
[73] Assignee: Sogeref, Agen, Lot-et-Garonne, France
[22] Filed: Nov. 3, 1972
[21] Appl. No.: 303,472

[30] Foreign Application Priority Data
    Nov. 5, 1971    France .............................. 71.39852

[52] U.S. Cl............................. 106/15 AF; 117/154
[51] Int. Cl................................................ C09d 5/14
[58] Field of Search................................ 106/15 AF

[56]         References Cited
         UNITED STATES PATENTS
2,472,847   6/1949   Osborne ........................ 106/15 AF
2,978,338   4/1961   Greathouse..................... 106/15 AF
3,139,350   6/1964   Valenzin.......................... 106/15 AF Primary Examiner—Harry Wong, Jr.
Attorney, Agent, or Firm—Karl W. Flocks

[57]                ABSTRACT

A process for the production of a varnish possessing contact insecticidal activity, comprising dissolving or dispersing at least one suitable insecticide product in a polar organic solvent compatible with the insecticide, the resulting problem or emulsion being incorporated at ambient temperature, in an emulsified base for varnish which is compatible with the polar solvent.

4 Claims, No Drawings

INSECTICIDE VARNISH

BACKGROUND OF THE INVENTION

1. Field of the Invention

The present invention relates to a method of manufacturing a varnish and primarily to a product imparting washability to wallpaper and which possesses contact insecticide activity, and also relates to the resultant varnish ready for use and to a support coated with this varnish.

2. Description of the Prior Art

In the paint industry it is known for emulsified bases, particularly vinyl and acryl emulsified bases, to be applied to suitable supports, such as wallpapers. This application is fairly common with wallpapers of mediocre quality, in order to make them washable by coating them with plastics. The use of wallpaper to provide a permanent insecticide wall covering has however not been found possible in a satisfactory manner up to the present time.

An object of the present invention therefore, is to provide a method of producing an agent imparting washability to wallpapers which in addition has a lasting insecticide activity in respect of a large number of insects, this activity being developed by contact.

SUMMARY

According to the present invention a process for producing a varnish having insecticidal activity comprises dissolving or dispersing at least one suitable insecticide product in a polar organic solvent compatible with the insecticide, the resulting solution or emulsion being incorporated, at ambient temperature, in an emulsified base for varnish which is compatible with the polar solvent.

DESCRIPTION OF THE PREFERRED EMBODIMENTS

The insecticide may be dissolved or dispersed in a hot state in the polar organic solvent and may be dissolved or dispersed at a temperature of 15° to 80°C in an amount of 1 to 12% by weight of insecticide in the polar solvent.

The insecticide product may be of organophosphorus, organo-chlorine, or carbamate type, alone or mixed.

The polar organic solvent may be butanol, toluene, a xylene, or isobutyl acetate.

The solution of insecticide product in the polar organic solvent may be incorporated in the emulsified base for varnish, with agitation, in an amount of 15-45% by weight.

The emulsified base may be of the vinyl, acryl, or fatty type.

The insecticide activity of the agent which imparts washability and which is obtained by the process of the invention, irrespective of the nature of the contact insecticide product incorporated in the base emulsions acting as binder, is developed provided that the active insecticide product rises to the surface of the film enclosing it before the polymerisation of the film. This result is achieved both as the result of the surface tension of the carrier varnish, which remains transparent, and through the effect of the strong polarity of the solvent.

If a plurality of insecticides are applied simultaneously, a better shock curve and also better remanence can be obtained due to the synergistic effect of outside The evaporation of the polar solvent, after application of the insecticide varnish to a support, entrains, transports, and orients the reformed insecticide crystals to the outside of the coat of varnish, which, on drying, retains the active product in a vigorous manner.

The varnish obtained by the process of the invention has an effective insecticide activity, in contradistinction to the result which would be obtained by simply adding an insecticide product to an emulsion; in the latter case, in fact, the contact insecticide would remain enclosed in the varnish film and would consequently be inoperative.

The process of the invention is applied to the production of transparent insecticidal varnishes with any type of binder and may be applied to the coating of any suitable support, particularly wallpaper. In this case, coating may be effected after the paper has been applied to the wall surface or during its manufacture.

While the present invention has been described in connection with a preferred example any technically equivalent means may be applied.

I claim:

1. In a process for the production of a varnish having contact insecticidal activity and utilizable as a wall covering, comprising mixing an insecticide selected from the group consisting of organo-chlorine insecticides, organo-phosphorus insecticides, carbamate insecticides and mixtures thereof with a varnish selected from the group consisting of the fatty type, the vinyl type and the acryl type, the improvement consisting essentially of:

mixing 1–12% by weight of said insecticide at 15°–80°C. with a polar organic solvent compatible with said insecticide, said organic solvent being selected from the group consisting of butanol, xylene, toluene and isobutyl acetate, to provide a mixture having polarity and surface tension characteristics to effect migration thereof to the surface of said varnish; and incorporating 15–45% by weight of said resulting mixture, at ambient temperature, into said varnish in the form of an emulsified varnish based compatible with said polar solvent to provide a varnish having contact insecticidal activity upon the evaporation of said solvent and the drying of said varnish after application to a support, the insecticide being oriented toward the surface of the resulting film through the action of the surface tension of the product and the polarity of the solvent.

2. A process according to claim 1, in which said insecticidal product is brought into contact with said polar solvent by dissolution.

3. A process according to claim 1, in which said insecticidal product is brought into contact with said polar solvent by dispersion.

4. Varnish having contact insecticidal activity and utilizable as a wall covering, resulting from the method comprising:

mixing at 15° to 80°C from 1 to 12% by weight of at least one insecticidal product selected from the group consisting of organo-chlorine, organo-phosphorous and carbamate compounds, in a polar organic solvent selected from the group consisting of butanol, toluene, xylene and isobutyl acetate, then incorporating from 15 to 45% by weight of the resulting medium at ambient temperature in an emulsified varnish base selected from the group consisting of the fatty type, the vinyl type and the acryl type whereby there is obtained a varnish having contact insecticidal activity resulting from the fact that on evaporation of the said polar organic solvent, after application to a support, the insecticide is oriented towards the surface of the resulting film through the action of both the surface tension of the product and the polarity of the said solvent.

* * * * *